United States Patent [19]

Sewell

[11] 3,784,832

[45] Jan. 8, 1974

[54] OPTICAL SCANNING APPARATUS FOR AVOIDING AMBIGUITY IN A QUANTISED SIGNAL

[75] Inventor: Brian Constantine Sewell, Teddington, England

[73] Assignee: The Rank Organization Limited, London, England

[22] Filed: Jan. 19, 1973

[21] Appl. No.: 325,159

[30] Foreign Application Priority Data

Jan. 19, 1972 Great Britain .................... 2,531/72

[52] U.S. Cl......... 250/226, 250/219 Q, 235/61.11 E

[51] Int. Cl. ................................................ G01j 3/34

[58] Field of Search.................... 250/226, 227, 202; 350/96 R; 356/173, 178, 186, 191, 195; 235/61.11 E; 219/9, 9 A

[56] References Cited

UNITED STATES PATENTS

| | | | |
|---|---|---|---|
| 3,225,177 | 12/1965 | Stites et al. | 235/61.11 E |
| 3,298,015 | 1/1967 | Herman | 250/226 X |
| 3,335,287 | 8/1967 | Hargens | 250/227 |
| 3,490,002 | 1/1970 | Hardin et al. | 250/202 X |
| 3,584,779 | 6/1971 | Kessler | 250/227 X |

*Primary Examiner*—Walter Stolwein
*Attorney*—Joseph F. Brisebois et al.

[57] ABSTRACT

Apparatus for avoiding ambiguity in a quantised signal representing a pattern which is scanned by an optical detector. The apparatus operates to scan the pattern to be represented and to produce a quantised signal each quantum of which represents the major colour in each scanning element of the pattern scanned. Sampling means are provided which sample the binary signal produced by the scanning means at a rate higher than the rate at which the signal is ultimately to be quantised and the output from the sampling means controls a gating circuit which operates to prevent the signal representing the pattern from changing from a representation of one colour to a representation of another unless a predetermined number of the samples all represent one colour. This avoids any indeterminacy in the quantised signal at colour junctions where there are two or more colours present in an element being scanned, and no colour is sufficiently predominant for the detectors to unambiguously provide an output representing only that colour.

8 Claims, 2 Drawing Figures

OPTICAL SCANNING APPARATUS FOR AVOIDING AMBIGUITY IN A QUANTISED SIGNAL

Figure 1:
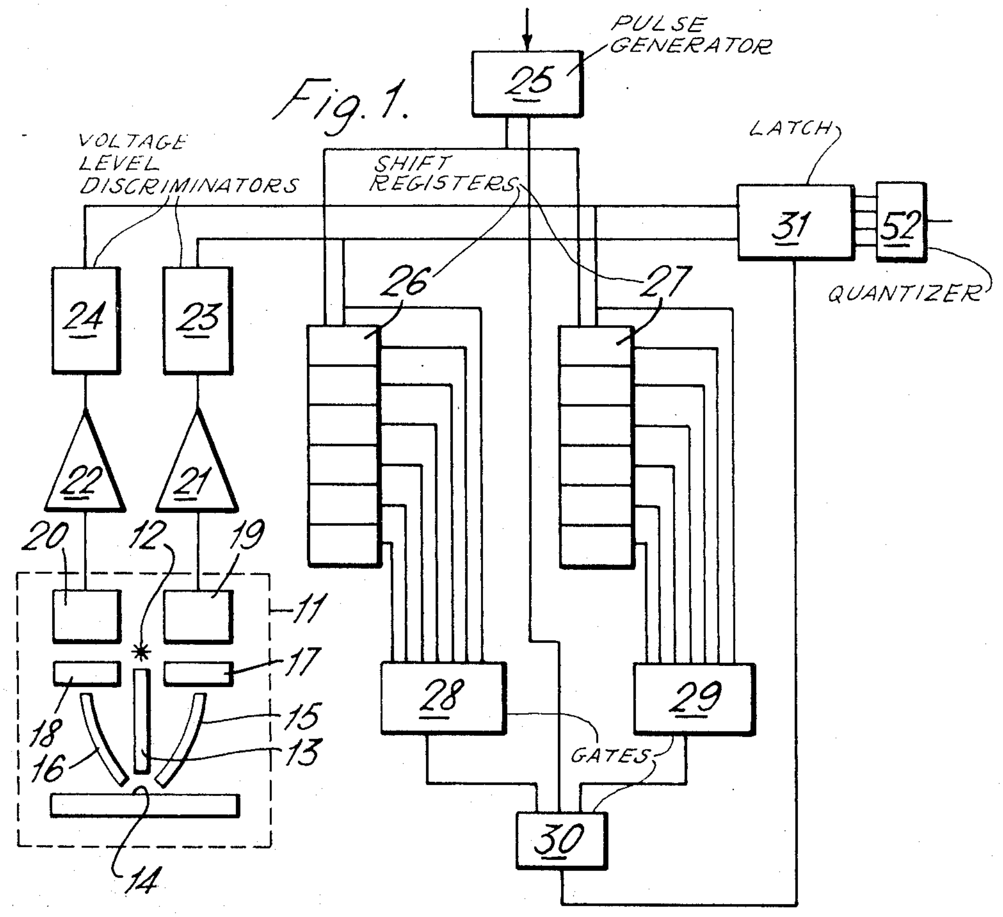

The present invention relates to optical scanning, and particularly to an improved apparatus for scanning a pattern of colours to provide a coded signal representing the pattern. The term "pattern" will be understood in this specification to relate to any design in one or more colours whether regular or not and to include any artistic design.

A method and apparatus are known for optically scanning a pattern to provide such a coded signal representing the pattern which may be in any number of colours. This method finds particular utility for the preparation of control signals for the operation of automatic textile or knitting machines. In such machines it is necessary to provide an input signal in coded form which represents the pattern to be produced by the machine. Since these machines operate to form the textile or knitted material line by line it is convenient for the coded signals to be in binary form representing the pattern line by line, each line comprising a plurality of units of information representing successive elements of the pattern. The successive elements are all of substantially the same size which is determined by the scanning device, and are independent of the pattern itself.

Typically, the optical scanning is performed by means of a scanning head which is moved continuously or incrementally along successive lines across a pattern to be coded. The head may comprise means for illuminating successive elements of an object bearing the pattern and colour detectors sensitive to the colour of the illuminated element and responsive to provide an electrical signal representing the colour of the illuminated element. Because the size and position of successive elements of the pattern to be coded are determined by the scanning apparatus with no reference to the nature of the pattern it frequently happens that an illuminated element contains two or more colours. This gives rise to ambiguity of the coded signal since the detectors of the scanning apparatus which are responsive to each colour may both or all provide an output for incorporation into the coded output signal. This will result in the coded signal being unintelligible in respect of these elements or in the coded signal including a spurious integer representing a colour which does not occur in the pattern being coded.

This problem is particularly acute in the case of a pattern having one or more demarcation lines between different colours at a small angle to the scanning line since in this case the ambiguity may extend over a number of successive elements of the pattern.

According to the present invention there is provided apparatus for optically scanning a pattern to produce a quantised coded signal representing the pattern, of the type having means for scanning successive regions of an object bearing the said pattern and at least two colour detectors the outputs of which provide signals from which the said quantised signal representing the pattern is obtained, in which there are provided means for taking a plurality of sequential samples of the outputs of the said detectors at a predetermined sampling rate, which is greater than the quantising rate, and means responsive to the output of the sampling means to prevent the said coded signal representing the pattern from changing from a representation of one colour to a representation of another at a point where the pattern changes from one colour to the other, unless the output signals from both or all the colour detectors each represent only one colour for at least a predetermined number of the said successive samples.

The quantizing interval of the signal will normally be determined by the degree of accuracy required for the purpose to which the signal is to be put (within the mechanical limitations of the scanning apparatus, such as illuminating spot size etc.) and the quantization of the signal is effected in apparatus which does not form part of this invention, to which the output signal from the above described apparatus is passed. The scan may be incremental or continuous, each pattern element being made up of a number, normally 10 , primary samples as determined by the speed of the scan and the sampling rate.

In a preferred embodiment of the invention the means responsive to the output of the said sampling means include a plurality of shift registers coupled to receive sampling signals from respective colour detectors, the parallel outputs of each shift register being couled to a gating network which provides an output signal only when at least a predetermined number of the said parallel outputs together with the input are in the same state.

Preferably the sampling rate is in the region of 10 times greater than the quantizing rate; similarly, it is preferred that the said predetermined number of parallel outputs of the shift registers is three or four.

Figure 2:
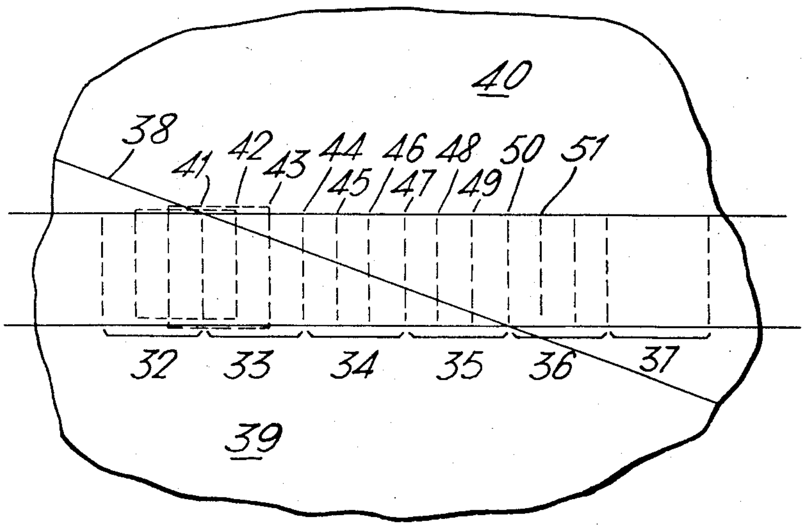

One embodiment of the present invention will now be more particularly described, by way of example, with reference to the accompanying drawings, in which:

FIG. 1 is a block diagram illustrating apparatus for scanning an object bearing a pattern to be encoded and for producing a coded colour signal representative of the pattern; and FIG. 2 is a schematic illustration of a part of a pattern showing the successive elements scanned by apparatus such as that shown in FIG. 1.

Referring now to FIG. 1 there is shown generally indicated within the broken line 11 a scanning head comprising a source of light 12 having a light guide 13 for directing light from the source onto the surface of an object 14 bearing a pattern to be scanned. The scanning head also comprises two optical detectors comprising light guide 15 and 16 leading respectively to colour filters 17 and 18 which are located in front of the sensitive face of respective photoelectric devices 19 and 20. The colour filters 17 and 18 are so chosen with respect to the pattern to be scanned that the combined outputs from the photoelectric devices 19 and 20 will provide, in this embodiment, an unambiguous representation of up to four different colours in the pattern.

Each photoelectric device 19, 20 is arranged that it will only provide an output electrical signal when light is incident upon its sensitive face; the signal output from each detector is at a high value when light in the transmission band of the corresponding fliter is present and at a low value when it is not. The high and low level states are converted into logical levels 1 and 0 by amplifiers 21, 22 and decision circuits or voltage level descriminators 23, 24. The colour filters 17 and 18 allow light of wavelengths within a given range to fall on the detectors 19 and 20 so that an output from one detector will indicate that light within a given frequency range is present in the element of the pattern being scanned and similarly a signal from the other detector will indicate that light within a second pre-determined frequency range is present in the element of the pattern being scanned. If each filter is chosen so that the range of frequencies which it will transmit overlaps with the range transmitted by the other filter, then when there is an output from both detectors simultaneously this will indicate that a colour within the range of the overlap frequencies is present in the element being scanned or that both colours are present simultaneously as with a white sample; an output from say the detector 20 when there is not output from the detector 19 will indicate that the colour of the element being scanned, or at least the colour occupying the majority of the area of the element being scanned, lies in that part of the frequency range passed by the filter 18 which does not overlap with the frequency range passed by the filter 17. Similarly, if both photoelectric detectors are producing no output it will indicate that any colour present in the element being scanned lies outside the frequency ranges of the two filters 17 and 18, or that the element is black.

The outputs from the decision circuits 23, 24 which are at compatible logic levels are passed to shift registers 26, 27. The shift registers are pulsed by means of pre-pulses from one of the outputs of pulse generator 25 whereby successive samples of the inputs appear at the parallel outputs of the shift registers, the time intervals being determined by the pulse generator rate. The input of each shift register and the parallel outputs are fed to respective gating networks 28 and 29. The outputs of these are applied to a further gate system 30 together with a clock pulse source from 25, these clock pulses being slightly delayed with respect to the alternative output of 25 which feeds the shift registers. The output of 30 is taken to a latch circuit 31 and serves to enable this circuit and cause it to accept and store the input signals at that time appearing at its input. The outputs are 2 binaries having four states which are fed to a quantising circuit 52.

The circuit operates as follows. The scanning head 11 is traversed along a line as shown in FIG. 2. The light from the source 12 which is emitted from the light guide 13 towards the object 14 will illuminate an area roughly the size of each element shown in FIG. 2, some of the elements are numbered 32 to 37 for reference in the following description. The two light guides 15 and 16 transmit light reflected from the elements, such as the element 32, to their respective filters 17 and 18. It is desired that the signal representing the pattern shall not change from a representation of one colour to a representation of another until the subsequent colour is well established in order to avoid any ambiguity in the representation of the pattern at those elements where more than one colour is present; that is when a demarcation line between one colour and another passes through an element.

If, for example the element being illuminated is the element 32 illustrated in FIG. 2, this element is all of one colour which, for example may lie in the frequency range passed by the filter 18 and stopped by the filter 17. Accordingly the photoelectric detector 20 will produce a 1 output and the photoelectric detector 19 will produce an 0 ouput; these signals are passed to the shift registers 26, 27 and advanced in the register by the clock pulses at a sampling rate in excess of the final quantizing rate which is determined by the overall requirements of the process. The detector head is moved either uniformly or in steps corresponding to the sampling interval along each line across the pattern. The signals from the detectors change only when a colour change occurs. The sampling rate is determined by the pulse generator 25. It is to be understood that 25 will normally be triggered by a signal which also controls the movement of the scanning head, e.g., a stepping motor. Consequently the increment of distance corresponding to a sampling interval is exactly known. The ultimate quantizing rate is obtained by dividing down from the said repetition rate and may be one tenth of that rate. This reduction process is external to the apparatus shown in FIG. 1. The size of the element 32, 33 etc. in FIG. 2 represents the area illuminated which is less than the area of a final pattern element or quantum but not in any specific ratio thereto. For the purpose of illustration it is to be assumed that the area of illumination moves from left to right, its position being indicated by its leading edge 41, 42 etc. at successive sampling times. It is also assumed that there are three samples in each illumination element but this number is not specific.

Now, when a boundary between two colours such as the boundary 38 shown in FIG. 2 is at an acute angle to the line of travel of the detecting head 11 the change in signal of the detectors 19 and 20 will have a certain ambiguity in the regions 34 and 35 of FIG. 2. This ambiguity is resolved by the gating networks 28 and 29 which are arranged to provide an output only when a predetermined number of the parallel outputs together with the inputs of the shift registers 26 and 27 are all 1 or all 0 in each register. There are thus four possible conditions for an output to appear. For example, as the head travels towards element 34 the detector 20 (assuming it is sensitive to the colour in the region 39) will continue to produce a 1 signal throughout the time taken to scan across the element 33, positions 42, 43, 44.

The detector 19 (assuming that it is sensitive to the colour of the area 40) will be producing a 0 output during the scan of the element 33 and will begin to produce a 1 output at some point during the scan across the element 34 depending on the sensitivity of the detector, this will most probably occur when the illumination covers the element 34, at position 47, since the areas of the element covered by each colour are substantially the same at this position. Thus, at position 47 both detectors 19 and 20 will be producing a 1 output since the areas of the element 34 then illuminated covered by each colour, will be substantially the same. However, the combined ouputs from the two detectors 19 and 20 both being 1 would indicate that a different colour (that is a colour other than the colours of the areas 39 and 40) is present in the element 34. Since detector 19 has produced a 1 output, which is a change, this is entered in the Shift register 26. The inputs to gate 28 are now different and thus no change is made to the output of the latch 31 and the output from the quantising circuit 32 remains the same. At postion 48 detector 20 "sees" a predominance of the colour to which it is insensitive and will change to a 0 output. This is entered in Shift register 27 and the outputs from 27 are now different. As the scan proceeds further similar samples are entered in each register since the outputs from the detectors remain consistent. At position 51 four similar samples will have been entered in each shift register, and the two outputs from 28 and 29 will in coincidence with the delayed clock pulse input to gate 30, produce an enabling signal to actuate the latch 31. The new signals 0, 1 at the input of 31 are then registered and transferred to the output in 2-bit binary form. The signal from the quantising circuit 52 thus change unambiguously from a representation of the colour 39 to a representation of the colour 40 when the scan reaches position 51.

Now, when a boundary between two colours such as the boundary 38 shown in FIG. 2 is at an acute angle to the line of travel of the detecting head 11 the change in signal of the detectors 19 and 20 will have a certain ambiguity in the regions 34 and 35 of FIG. 2. This ambiguity is resolved by the gating networks 28 and 29 which are arranged to provide an output only when a predetermined number of the parallel outputs together with the inputs of the shift registers 26 and 27 are all 1 or all 0 in each register. There are thus 4 possible conditions for an output to appear. For example, as the head travels towards element 34 the detector 20 (assuming it is sensitive to the colour in the region 39) will continue to produce a 1 signal throughout the time taken to scan across the element 33, positions 42, 43, 44.

The detector 19 (assuming that it is sensitive to the colour of the area 40) will be producing a 0 output during the scan of the element 33 and will begin to produce a 1 output at some point during the scan across the element 34 depending on the sensitivity of the detector, this will most probably occur when the illumination covers the element 34, at position 47, since the areas of the element covered by each colour are substantially the same at this position. Thus, at position 47 both detectors 19 and 20 will be producing a 1 output since the areas of the element 34 then illuminated covered by each colour, will be substantially the same. However, the combined outputs from the two dectors 19 and 20 both being 1 would indicate that a different colour (that is a colour other than the colours of the areas 39 and 40) is present in the element 34. Since the detector 19 has produced a 1 output, which is a change, this is entered in the Shift register 26. The inputs to gate 28 are now different and thus no change is made to the output of the latch 31 and the output from the quantising circuit 32 remains the same. At position 48 detector 20 "sees" a predominance of the colour to which it is insensitive and will change to a 0 output. This is entered in Shift register 27 and the outputs from 27 are now different. As the scan proceeds further similar samples are entered in each register since the outputs from the detectors remain consistent. At position 51 four similar samples will have been entered in each shift register, and the two outputs from 28 and 29 will in coincidence with the delayed clock pulse input to gate 30, produce an enabling signal to actuate the latch 31. The new signals 0, 1 at the input of 31 are then registered and transferred to the output in 2-bit binary form. The signal from the quantising circuit 52 thus change unambiguously from a representation of the colour 39 to a representation of the colour 40 when the scan reaches position 51.

I claim:

1. In a device for optically scanning a pattern to produce a quantised coded signal representative thereof, comprising:

scanning means operating to scan successive regions of an object bearing said pattern, at least two colour detecting means arranged to receive light from said scanning means, said colour detecting means producing output signals representative of the colour of each successive region as it is scanned by said scanning means, and quantising means coupled to receive said output signals from said colour detecting means and operating to produce quantised signals therefrom at a predetermined quantising rate, the improvement wherein there are provided:

sampling means operative to take a plurality of samples of said output signals from said colour detecting means at a predetermined sampling rate greater than said predetermined quantising rate, gating means coupled to the output of said sampling means to receive said samples said gating means operating to prevent the signal fed to said quantising means from changing from a representation of one colour to a representation of another colour when said scanning means passes a point where said pattern changes from one colour to another, unless a predetermined number of successive said samples taken from each of said outputs of said colour detecting means represent only one colour respectively.

2. The device of claim 1 wherein said colour detectors produce a binary output signal in dependence on the colour of light incident thereon.

3. The device of claim 2 wherein said sampling means includes a plurality of shift registers coupled to receive said outputs from respective said colour detecting means, said gating means being coupled to the parallel outputs of said shift registers and operating to provide an output signal only when at least a predetermined number of said parallel outputs of said shift registers, together with said input thereto, are all in the same state.

4. The device of claim 3 wherein said gating network is responsive to output signals from only a predetermined group of said parallel outputs of said shift registers.

5. The device of claim 1 wherein said predetermined sampling rate is in the region of ten times greater than said predetermined quantising rate.

6. The device of claim 3 wherein said predetermined number of said parallel outputs of said shift registers is three.

7. The device of claim 3 wherein said predetermined number of said parallel outputs of said shift registers is four.

8. The device of claim 1 wherein said colour detectors each comprise, a photo electric detector, a colour filter adjacent the sensitive face of said photo electric detector, an amplifier connected to receive at its input the output signals from said photo electric detector, and a voltage level discriminator connected to receive at its input the output signals from said amplifier, said voltage discriminator producing a binary signal output from said input signal.

* * * * *